(No Model.)

G. A. PERKINS.
SADDLE SPRING FOR VELOCIPEDES.

No. 486,294. Patented Nov. 15, 1892.

Witnesses

Inventor

UNITED STATES PATENT OFFICE.

GEORGE A. PERKINS, OF CAMBRIDGE, MASSACHUSETTS.

SADDLE-SPRING FOR VELOCIPEDES.

SPECIFICATION forming part of Letters Patent No. 486,294, dated November 15, 1892.

Application filed January 13, 1892. Serial No. 417,999. (No model.)

*To all whom it may concern:*

Be it known that I, GEORGE A. PERKINS, a citizen of the United States, residing at Cambridge, in the county of Middlesex and Commonwealth of Massachusetts, have invented certain new and useful Improvements in Saddle-Springs for Velocipedes; and I do hereby declare that the following is a full, clear, and exact description of my invention.

My invention consists of two steel bars about one and one-fourth inches wide and from about one-eighth to five-sixteenth inches thick, which thickness is sufficient to be flexible and strong enough to bear the weight of a person upon a saddle or hammock stretched from B to G, as shown in the accompanying drawings, and which is one-half size and made a part of this specification.

Figure 1:
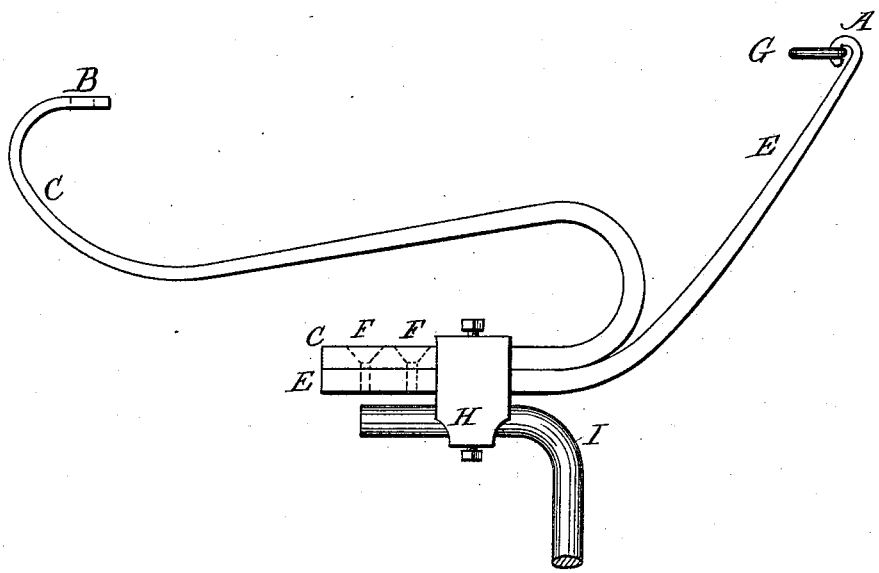
Figure 2:
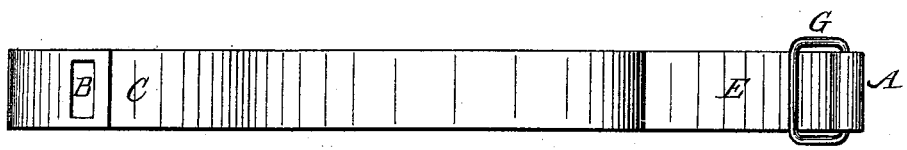

Figure 1 is a vertical section. Fig. 2 is a top view as it appears after the removal of the saddle or hammock.

Similar letters refer to similar parts throughout the two views.

It is made by either welding or riveting the two bars, as shown at F F in Fig. 1, making substantially one spring. It is advisable to make the bars gradually thinner toward the ends A and B. The bars are then bent as shown in Fig. 1, the end of the bar E E at A being about one inch higher than the end of the bar C C at B, as the cross-bar at the rear end of the saddle or hammock when bolted at B is sufficiently thick to make the top level with the front end at G. The end of the bar E E at A is bent around the ring G, in which is hung the front end of the saddle or hammock. Near the end of the bar C C is a hole B, in which is bolted the cross-bar at the rear end of the saddle or hammock. It is to be clamped to the velocipede I substantially as at H. The tendency of the S spring or bar C C when a person is riding is downward, but by being connected at G by a saddle or hammock the curved spring or bar E E holds it up, at the same time being sufficiently flexible and elastic to cause an easy rocking or forward-and-backward movement. The two bars or springs, by both being flexible and elastic, cause a movement or spring directly up and down, for the weight of the rider tends to make the two ends G and B approach each other and then spring apart to their former place.

This saddle-spring makes riding comfortable and easy, affording a triple movement or spring, taking up the vibration and jar. It is light and simple, strong, and easily adjusted. The movement or spring is forward, backward, and downward, and not sidewise, thereby causing the velocipede to run steady and be easily balanced.

Having fully described my invention, what I claim herein and desire to secure by Letters Patent, is—

The combination of the S-shaped spring C C with the curved spring E E, secured at F F, substantially as shown in the drawings, and described herein.

GEO. A. PERKINS.

Witnesses:
GEO. B. FRENCH,
FREEMAN HUNT.